(12) United States Patent
Higano et al.

(10) Patent No.: US 10,108,041 B2
(45) Date of Patent: Oct. 23, 2018

(54) LIQUID CRYSTAL DISPLAY DEVICE

(71) Applicant: Japan Display Inc., Tokyo (JP)

(72) Inventors: Toshiyuki Higano, Tokyo (JP); Emi Higano, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/872,685

(22) Filed: Oct. 1, 2015

(65) Prior Publication Data

US 2016/0097946 A1 Apr. 7, 2016

(30) Foreign Application Priority Data

Oct. 2, 2014 (JP) ................................. 2014-204077

(51) Int. Cl.
*G02F 1/1335* (2006.01)
*G02F 1/1343* (2006.01)

(52) U.S. Cl.
CPC .. *G02F 1/133512* (2013.01); *G02F 1/134363* (2013.01); *G02F 2001/134318* (2013.01)

(58) Field of Classification Search
CPC ......... G02F 1/133512; G02F 1/134363; G02F 2001/134318; G02F 2001/134372; G02F 2001/134381
See application file for complete search history.

(56) References Cited

U.S. PATENT DOCUMENTS

| 5,282,068 A * | 1/1994 | Inaba | G02F 1/134336 349/111 |
| 2004/0141110 A1* | 7/2004 | Yu | G02F 1/13338 349/110 |
| 2007/0002246 A1* | 1/2007 | Chang | G02F 1/134363 349/141 |
| 2008/0278645 A1* | 11/2008 | Park | G02F 1/133371 349/38 |
| 2009/0109202 A1* | 4/2009 | Kitagawa | G02F 1/134363 345/206 |
| 2009/0160822 A1 | 6/2009 | Eguchi et al. | |
| 2010/0079693 A1* | 4/2010 | Yoshida | G02F 1/134363 349/40 |
| 2010/0091231 A1 | 4/2010 | Nishimura et al. | |
| 2011/0007256 A1 | 1/2011 | Yoshida et al. | |
| 2011/0050551 A1* | 3/2011 | Ota | G02F 1/134363 345/87 |
| 2013/0135540 A1* | 5/2013 | Nam | G02F 1/136286 349/12 |

(Continued)

FOREIGN PATENT DOCUMENTS

| JP | 2009-151138 A | 7/2009 |
| JP | 2010-096796 A | 4/2010 |
| JP | 2014-013411 A | 1/2014 |

*Primary Examiner* — Angela Davison
*Assistant Examiner* — Mariam Qureshi
(74) *Attorney, Agent, or Firm* — Typha IP LLC

(57) ABSTRACT

There is provided a liquid crystal display device that a high quality image with suppressed display unevenness can be obtained. A liquid crystal display device includes a first metal electrode, a black matrix disposed at regular spacings, and a liquid crystal. The first metal electrode is disposed to overlap the black matrix when seen perpendicularly from above, and a second metal electrode is disposed at a place at which the first metal is not disposed at a position at which the second metal electrode overlaps the black matrix between different color sub pixels.

5 Claims, 9 Drawing Sheets

CONDITIONS FOR WIDTH y OF ELECTRODE 260 :
· IF x > d, d/2 < y/2 < y/2+z
· IF x < d, x/2 < y/2 < y/2+z

(56) References Cited

U.S. PATENT DOCUMENTS

| | | | | |
|---|---|---|---|---|
| 2014/0014960 | A1* | 1/2014 | Yamazaki | G06F 3/0412 |
| | | | | 257/59 |
| 2014/0204284 | A1* | 7/2014 | Yao | G06F 3/044 |
| | | | | 349/12 |
| 2015/0370114 | A1* | 12/2015 | Du | G02F 1/13338 |
| | | | | 349/12 |
| 2017/0017329 | A1* | 1/2017 | Ono | G02F 1/136227 |

* cited by examiner d=3.3,
x=4,
y=4

LEFT-RIGHT ASYMMETRY FROM ELECTRODE EDGE

CONDITIONS FOR WIDTH y OF ELECTRODE 260 :
- IF $x > d$, $d/2 < y/2 < y/2+z$
- IF $x < d$, $x/2 < y/2 < y/2+z$

LIQUID CRYSTAL DISPLAY DEVICE

CLAIM OF PRIORITY

The present application claims priority from Japanese patent application JP 2014-204077 filed on Oct. 2, 2014 the content of which is hereby incorporated by reference into this application.

BACKGROUND OF INVENTION (1) Filed of the Invention

The present invention relates to a liquid crystal display device.

(2) Description of the Related Art

A touch panel is configured to recognize a position at which a pen or finger is touched on the touch panel and to drive the touch panel using positional information about this position as an input signal. A display device including a touch panel becomes popular because external input devices such as a keyboard and a mouse are unnecessary, and a liquid crystal display device including a liquid crystal display panel having a built-in touch sensor is also developed (see Japanese Patent Application Laid-Open No. 2009-151138, for example). It is noted that a technique of forming an electrode on a counter substrate is disclosed in Japanese Patent Application Laid-Open No. 2010-096796, for example.

SUMMARY OF THE INVENTION

The present inventors manufactured a liquid crystal display device in a liquid crystal display device having a built-in touch sensor in a structure in which in order to decrease the resistance of a common electrode (a common ITO electrode) used as an interconnection of a touch sensor, a metal electrode (in the following, referred to as a common metal electrode) is provided on a region shielded with a black matrix. As a result, it was revealed that a failure such as image unevenness is sometimes produced in the corner of a display screen (one or two corners randomly in four corners).

It is an object of the present invention to provide a liquid crystal display device that a high quality image with suppressed display unevenness can be obtained even in the case where a common metal electrode is provided for decreasing the resistance of interconnections of a touch sensor.

An embodiment to achieve the object is a liquid crystal display device including: a first substrate provided with a first metal electrode; a second substrate provided with a black matrix disposed between sub pixels; and a liquid crystal sandwiched between the first substrate and the second substrate. In the liquid crystal display device, the first metal electrode is disposed to overlap the black matrix when seen perpendicularly from above, and between different color sub pixels, a second metal electrode is disposed on the second substrate side at a place at which the first metal is not disposed at a position at which the second metal overlaps the black matrix when seen perpendicularly from above.

Moreover, another embodiment to achieve the object is a liquid crystal display device including: a first substrate provided with a thin film transistor, a planarization film disposed to cover the thin film transistor, a common electrode disposed on the planarization film, a first metal electrode that decreases a resistance of the common electrode, an interlayer insulating film disposed to cover the common electrode, and a pixel electrode disposed on the interlayer insulating film and connected to a drain of the thin film transistor; a second substrate provided with a black matrix disposed between sub pixels; and a liquid crystal sandwiched between the first substrate and the second substrate. In the liquid crystal display device, the first metal electrode is disposed to overlap the black matrix when seen perpendicularly from above, and between different color sub pixels, a second metal electrode is disposed on the second substrate side at a place at which the first metal is not disposed at a position at which the second metal overlaps the black matrix when seen perpendicularly from above.

Furthermore, in the liquid crystal display device, when a width of the first metal electrode between the different color sub pixels is defined as x, a width of the second metal electrode is defined as y, a distance between the second metal electrode and the pixel electrode in a horizontal direction is defined as z, and a distance between the second metal electrode and the first metal electrode in a vertical direction is defined as d, a width of the second metal electrode satisfies conditions:

if $x > d$, $d/2 \leq y/2 \leq y/2+z$ if $x < d$, $x/2 \leq y/2 \leq y/2+z$.

DETAILED DESCRIPTION OF THE PREFERRED EMBODIMENTS

Figure 6:
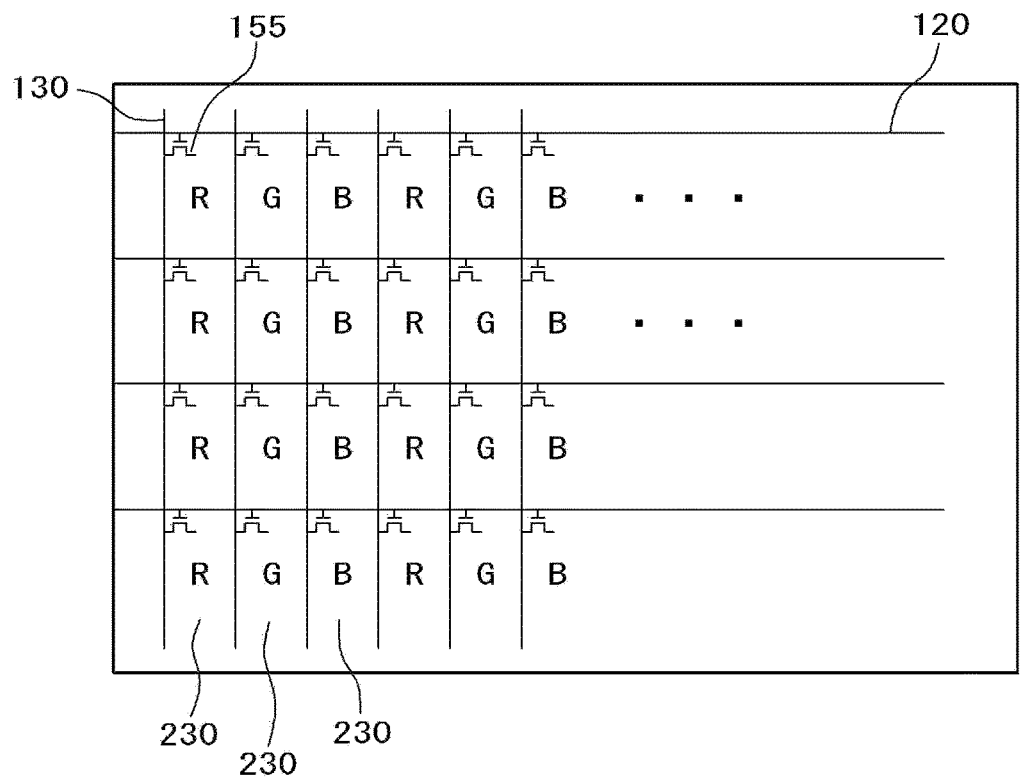
FIG. 6 is a schematic plan view of the display region of a liquid crystal display device that the present inventors investigated.
Figure 7:
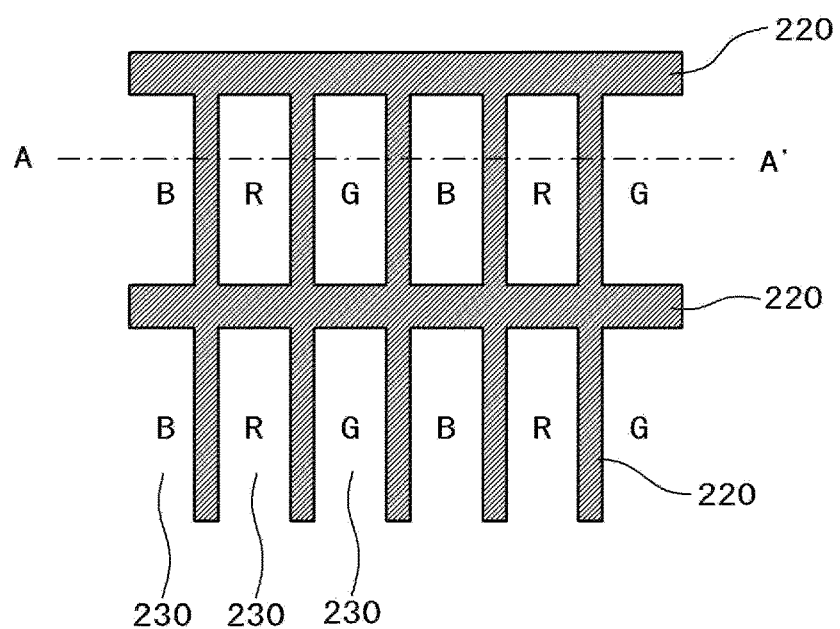
FIG. 7 is a schematic plan view of the display region of the liquid crystal display device that the present inventors investigated.
Figure 8:
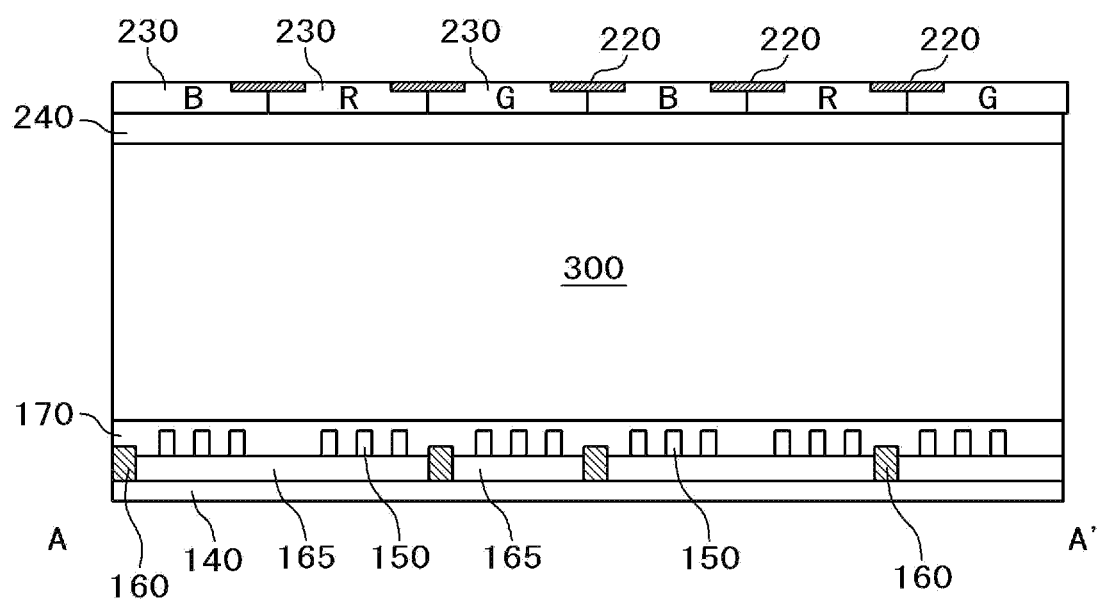
FIG. 8 is a cross sectional view taken along line A-A' illustrated in FIG. 7 (in the case where columnar spacers are not included)
Figure 10:
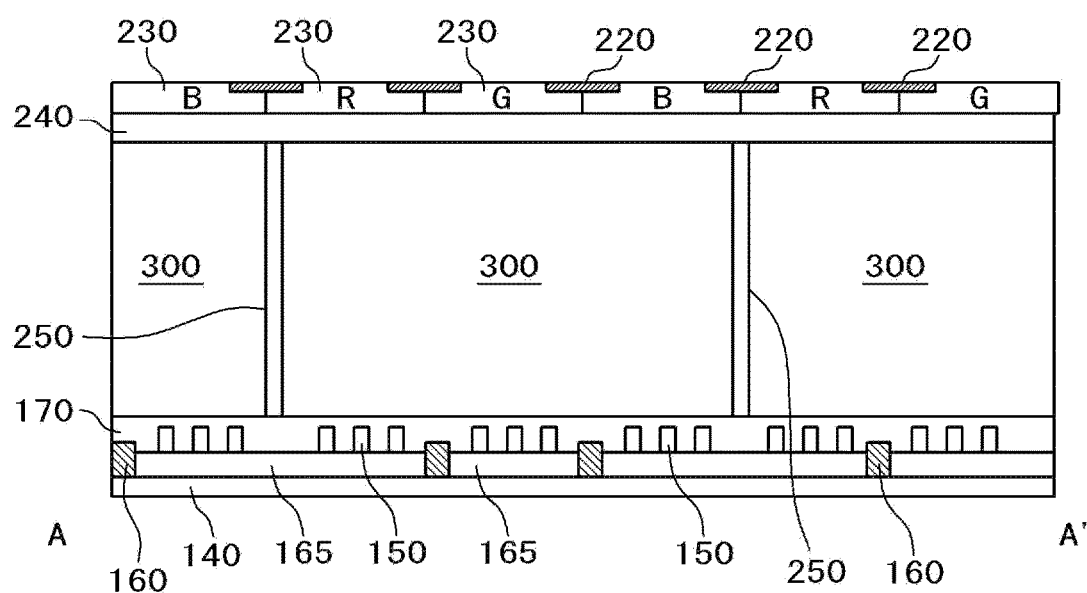
FIG. 10 is a cross sectional view taken along line A-A' illustrated in FIG. 7 (in the case where columnar spacers are included)

The present inventors investigated causes to produce a failure of image unevenness in the corner of a display screen (one or two corners randomly in four corners) in the case where a common metal electrode is provided for decreasing the resistance of an interconnection (a common electrode) of a touch sensor. FIG. 6 is a schematic plan view of the display region of a liquid crystal display device. FIG. 7 is an enlarged plan view, FIG. 8 is a cross sectional view taken along line A-A' illustrated in FIG. 7 (in the case where columnar spacers are not included), and FIG. 10 is a cross sectional view taken along line A-A' illustrated in FIG. 7 (in the case where columnar spacers are included). It is noted that in FIGS. 8 and 10, lower layers in which TFTs and the like are formed are omitted.

As illustrated in FIG. 6, the display region of the liquid crystal display device includes sub pixels in vertical stripes formed with color filters (CF) 230 in red (R), green (G), and blue (B), for example, and the sub pixels are disposed as one pixel includes R, G, and B filters. The sub pixels individually include a thin film transistor (TFT) 155. A scanning signal line (a gate line) 120 is connected to the gate electrode of the TFT, and a picture signal line (a source line) 130 is connected to the source electrode.

As illustrated in FIG. 7, a black matrix (BM) 220 is disposed between the sub pixels, and the scanning signal line 120 (in the lateral direction in FIG. 7) and the picture signal line 130 (in the vertical direction in FIG. 7) are disposed so as to overlap the black matrix 220 when seen from perpendicularly above.

The liquid crystal display device includes a TFT substrate, a counter substrate, and a liquid crystal 300 sandwiched between the substrates. As illustrated in FIGS. 8 and 10, a common electrode 140 that is used for the interconnection of the touch sensor, a common metal electrode (a first metal electrode) 160 that decreases the resistance of the common electrode, a pixel electrode 150 disposed through an interlayer insulating film 165 and connected to the drain electrode of the TFT, and the like are disposed on the TFT substrate side. It is noted that TFTs disposed below the common electrode 140, the scanning signal lines, the picture signal lines, a planarization film that covers the signal lines, a glass substrate on which these components are disposed, and the other components are omitted. On the counter substrate side, the black matrix 220, the color filters 230, an overcoat (OC) 240, and the other components are disposed. It is noted that a glass substrate, on which these components are disposed, and the other components are omitted.

Figure 9:
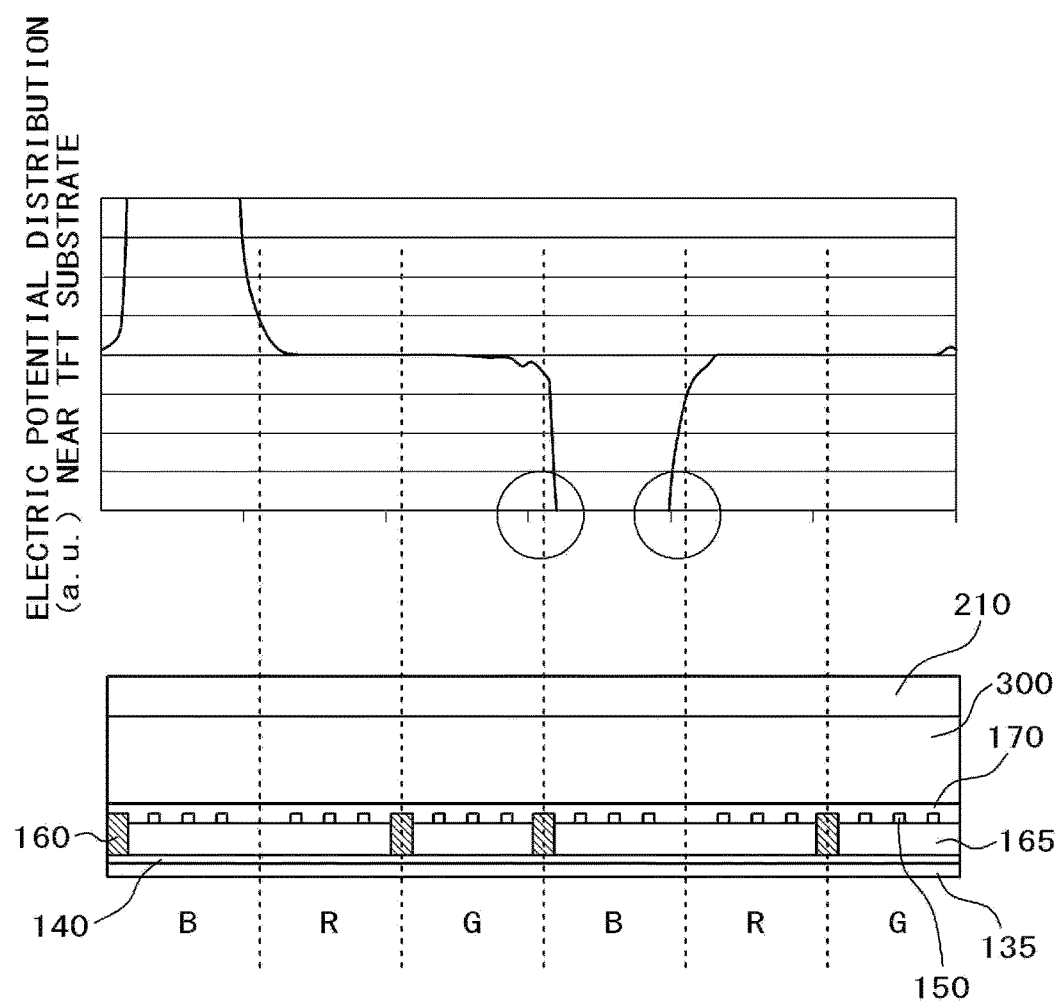
FIG. 9 is a diagram for explaining the distribution of an electric potential near a TFT substrate in the liquid crystal display device that the present inventors investigated, the upper part in FIG. 9 is the distribution of the electric potential near the TFT substrate, and a lower part in FIG. 9 is a cross sectional view of the principal part of the liquid crystal display device.

The motion of ions in the liquid crystal is affected by an electric field, and as a result of investigation from the viewpoint of disposing the electrodes, it was estimated that the common metal electrode is asymmetrically disposed because the common metal electrode is not allowed to be disposed on the region on which the columnar spacer is disposed, for example, and the distribution of an electric potential applied to the liquid crystal is also asymmetric to cause the uneven distribution of ions. Therefore, simulation was conducted for the distribution of an electric potential near the TFT substrate depending on the presence or absence of the common metal electrode. As a result, the following was revealed. As illustrated in FIG. 9, the distribution of the electric potential on the region on which the common metal electrode is not disposed (a portion depicted by a right circle on the upper part in FIG. 9) is different from the distribution of the electric potential on the region on which the common metal electrode is disposed (a portion depicted by a left circle on the upper part in FIG. 9). The distributions are in left-right asymmetry. The difference leads to a cause of the production of display unevenness because ions in the inside of the liquid crystal cell are unevenly distributed. In the case where the definition of cells becomes higher in future, there is concern that it is difficult to ignore the production of display unevenness caused by this asymmetric electric potential distribution. The present invention is made based on these new findings, and is to suppress the production of display unevenness by disposing an asymmetry improving electrode on the counter substrate side to improve the symmetry of the distribution of the electric potential in the case where common metal electrodes are not disposed at certain spacings and the common metal electrodes are asymmetrically disposed. The asymmetry improving electrode desirably has the same potential as the potential of the common metal electrode. It is noted that it can also be considered to dispose the asymmetry improving electrode on the TFT substrate side. However, as illustrated in FIG. 10, since a columnar spacer 250 that defines the distance between the TFT substrate and the counter substrate is sometimes disposed on the counter substrate side on a part of the region on which the black matrix is disposed, it is not preferable to form projections and recesses on the TFT substrate side from the viewpoint of adjusting the distance. In the case where projections and recesses are formed on the TFT substrate side, it is necessary to align the columnar spacers disposed on the counter substrate side with the projections and recesses disposed on the TFT substrate side. However, it is difficult to highly accurately align the columnar spacers with the projections and recesses by moving the substrates. It is noted that Japanese Patent Application Laid-Open No. 2010-096796 discloses a technique in which electrodes are disposed on the counter substrate side. However, the technique does not aim to improve electric potential symmetry caused by electrodes asymmetrically disposed on the TFT substrate side.

In the following, the present invention will be described in detail with reference to embodiments. It is noted that the disclosure is merely an example, and appropriate modifications conceived by a person skilled in the art within the teachings of the present invention are of course included in the scope of the present invention. Moreover, for further clarification of the drawings, the width, thickness, shape, and the like of the components are sometimes schematically depicted as compared with those of the actual forms. However, these are merely examples, and do not limit the present invention. The present invention is applicable to liquid crystal display devices in various modes including the FFS (Fringe Field Switching) mode, the IPS (In Plane Switching) mode, and other modes. Furthermore, in the present specification and the drawings, components similar to ones described in the drawings already presented are designated the same reference numerals and signs, and the detailed description is sometimes appropriately omitted.

First Embodiment

A liquid crystal display device according to a first embodiment of the present invention will be described with reference to FIGS. 1 to 4 and 11.

Figure 11:
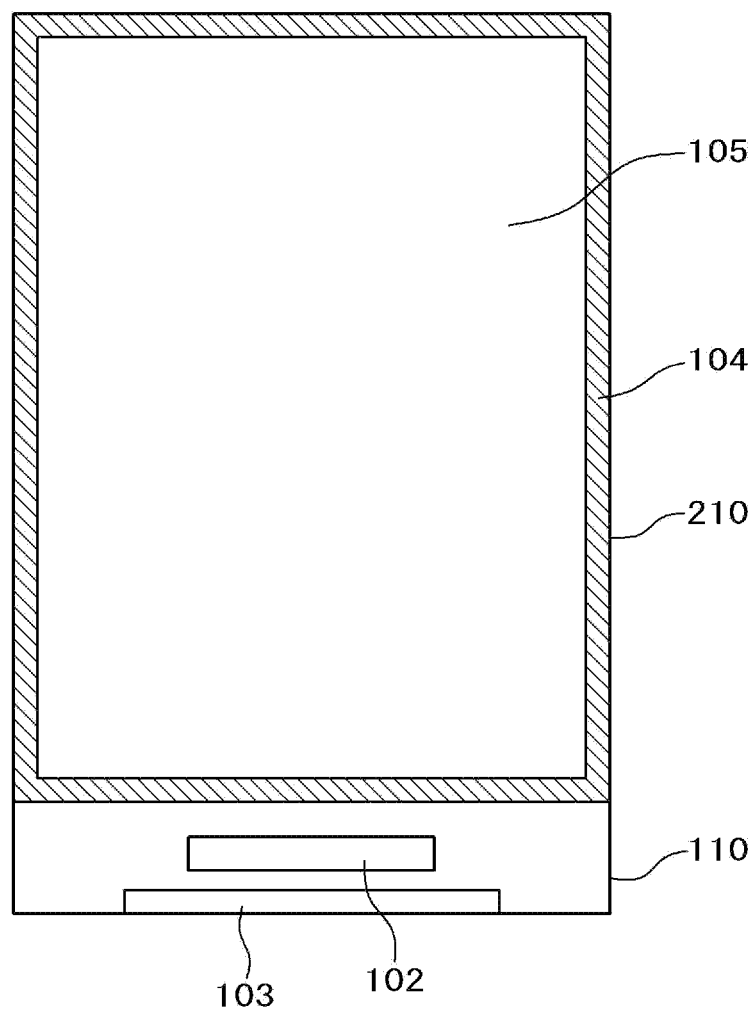
FIG. 11 is a schematic plan view of the liquid crystal display device that the present inventors investigated or the liquid crystal display device according to the embodiments of the present invention.

FIG. 11 is a schematic plan view of the liquid crystal display device according the embodiment. As illustrated in FIG. 11, a liquid crystal display device 100 includes a TFT substrate (an array substrate that is a first substrate) 110, a counter substrate (a CF substrate that is a second substrate)

210, and a liquid crystal sandwiched between the TFT substrate and the counter substrate. The TFT substrate 110 is attached to the counter substrate 210 with a sealing material 104. Scanning signal lines, picture signal lines, and pixels disposed in a matrix configuration are formed on a display region 105 of the TFT substrate 110. The pixel includes a TFT, a pixel electrode, a common electrode, and a common metal electrode that decreases the resistance of the common electrode. The scanning signal line is connected to the gate electrode of the TFT, and the scanning signal line is formed by the same processes and formed of the same material. Moreover, the picture signal line is connected to the source electrode of the TFT, and the picture signal line is formed by the same processes and formed of the same material. Furthermore, the pixel electrode is connected to the drain electrode of the TFT. However, names for the source, the drain, and the like are designated for convenience; in the case where one is designated the source, the other can be designated the drain. For the source electrode and the drain electrode, an aluminum silicon alloy (AlSi alloy) and a molybdenum tungsten alloy (MoW alloy), for example, can be used. In addition, for the pixel electrode and the common electrode, a transparent conductive film such as ITO (Indium Tin Oxide) and IZO (Indium Zinc Oxide) can be used. The counter substrate 210 includes a black matrix (BM) disposed at positions corresponding to the picture signal lines, the scanning signal lines, the common metal electrodes, and the like, and includes color filters (CF) disposed at positions corresponding to the transmission regions of the pixels, an overcoat (OC) disposed to cover the black matrix, and other components.

The TFT substrate 110 is greater than the counter substrate 210, and includes a region on which only the TFT substrate is provided. An IC driver 102 and a substrate terminal portion 103 to which a flexible circuit board is connected are disposed on the region. A backlight, an outer frame, and the like can be combined depending on applications.

Figure 1:
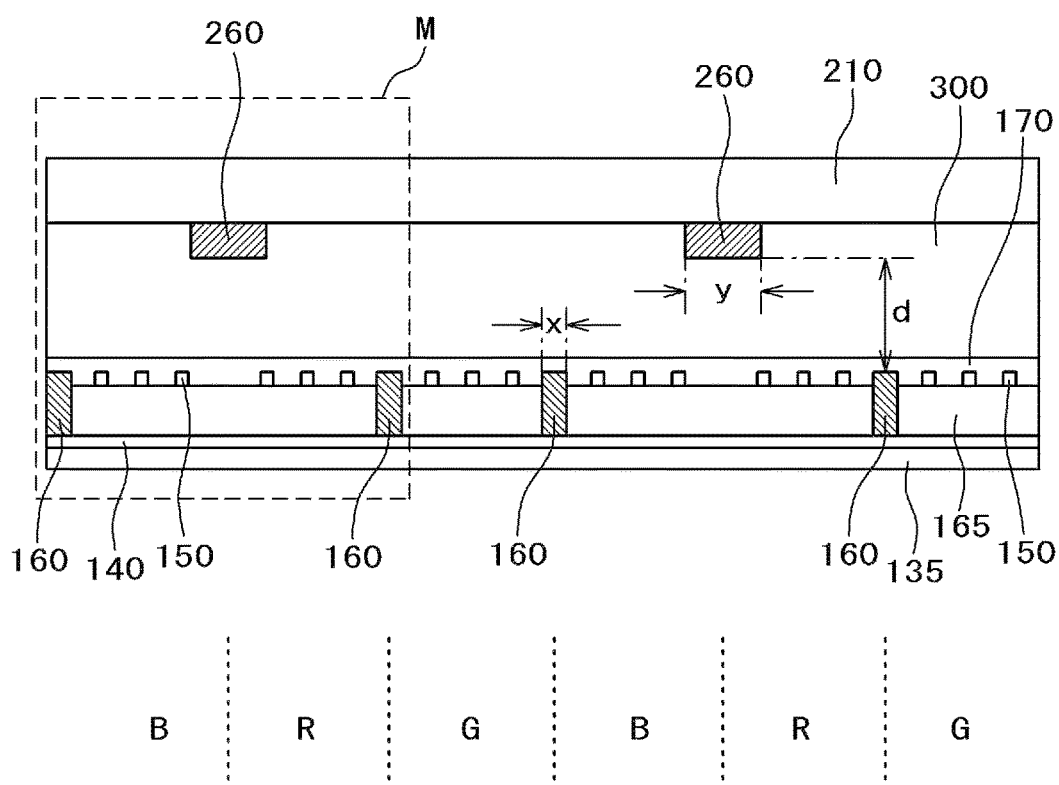
FIG. 1 is a cross sectional view of the principal part of a liquid crystal display device according to a first embodiment of the present invention.

Next, FIG. 1 is a cross sectional view near the common metal electrode of the liquid crystal display device according the embodiment. In the embodiment, on the TFT substrate side, a common electrode 140 and a common metal electrode (a first metal electrode) 160 are formed on an organic planarization film (HRC) 135, an interlayer insulating film 165 is formed so as to cover the common electrode 140, and a pixel electrode 150 is formed on the interlayer insulating film 165. Moreover, an alignment film 170 is formed so as to cover the pixel electrode. An asymmetry improving electrode (a second metal electrode) 260 is formed on the counter substrate 210 side as a liquid crystal 300 is sandwiched. The positions of the color filters (R, G, and B) are depicted on the lower side in FIG. 1. Although the asymmetry improving electrode 260 can be formed on the overcoat, the organic film, and the black matrix on the counter substrate 210 side, it is desirable to form the asymmetry improving electrode 260 at the position as close as the TFT substrate.

Figure 2:
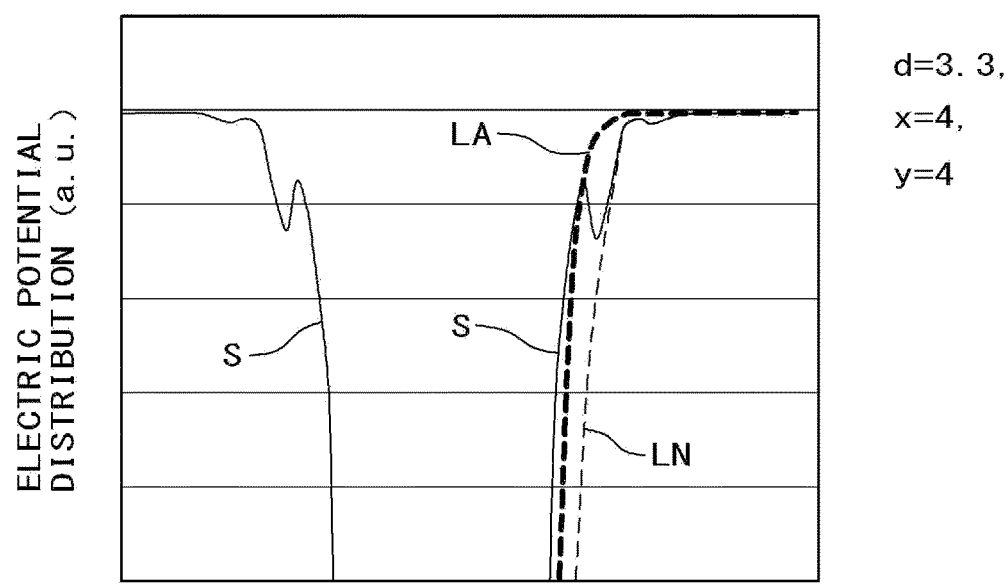
FIG. 2 is an electric potential distribution diagram for explaining the effect of an asymmetry improving electrode of the liquid crystal display device according to the first embodiment of the present invention.
Figure 3:
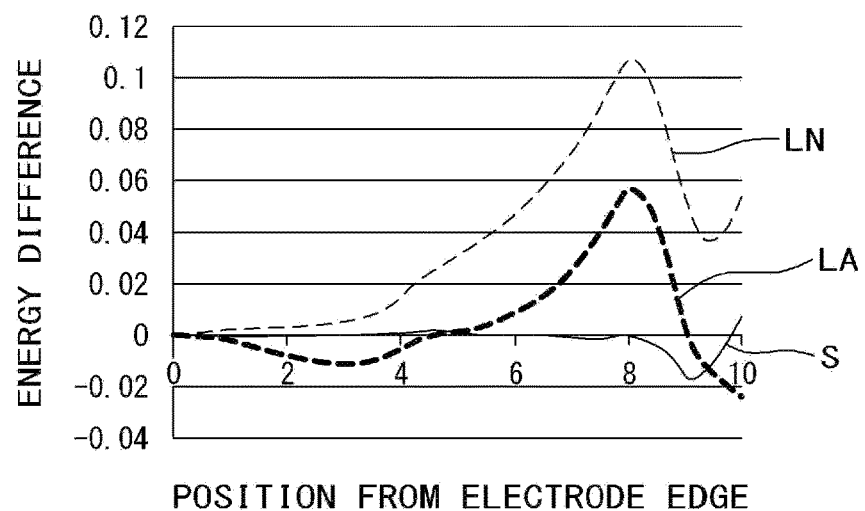
FIG. 3 is a diagram of energy differences for explaining left-right asymmetry from electrode ends.

Next, the effect of the asymmetry improving electrode 260 will be described with reference to FIG. 2. FIG. 2 is an electric potential distribution diagram for explaining the effect of the asymmetry improving electrode in the case where the width of the common metal electrode 160 between different color sub pixels is defined as x, the width of the asymmetry improving electrode 260 is defined as y, the distance between the common metal electrode 160 and the asymmetry improving electrode 260 in the vertical direction is defined as d (see FIG. 1), and d=3.3 μm, x=4 μm, and y=4 μm in the liquid crystal display device according the embodiment. In the case of the configuration in which the asymmetry improving electrode 260 is disposed in the center part in FIG. 2 and the common metal electrode 160 is disposed at both ends, a symmetric electric potential distribution S is depicted by a thin solid line, an electric potential distribution LN before the asymmetry improving electrode is disposed is depicted by a thin broken line, and an electric potential distribution LA after the asymmetry improving electrode is disposed is depicted by a thick broken line. The potential of the asymmetry improving electrode 260 was set to the same potential as the potential of the common metal electrode 160. It is revealed from FIG. 2 that the electric potential distribution LA after the asymmetry improving electrode is disposed is close to the symmetric electric potential distribution S as compared with the electric potential distribution LN before the asymmetry improving electrode is disposed. Moreover, also from the viewpoint of the energy difference as illustrated in FIG. 3, it is revealed that the distribution LA after the asymmetry improving electrode is disposed is close to the symmetric distribution S as compared with the distribution LN before the asymmetry improving electrode is disposed.

Next, the conditions for the width of the asymmetry improving electrode 260 between different color sub pixels will be described with reference to FIG. 4. In the case where the width of the common metal electrode 160 is defined as x, the width of the asymmetry improving electrode 260 is defined as y, the distance between the asymmetry improving electrode 260 and the closest pixel electrode 150 in the horizontal direction is defined as z, and the distance between the common metal electrode 160 and the asymmetry improving electrode 260 in the vertical direction is defined as d, the width y of the asymmetry improving electrode 260 desirably satisfies the following conditions:

$$\text{if } x > d, \ d/2 \leq y/2 \leq y/2 + z$$

$$\text{if } x < d, \ x/2 \leq y/2 \leq y/2 + z.$$

It is noted that z includes alignment accuracy.

Figure 4:
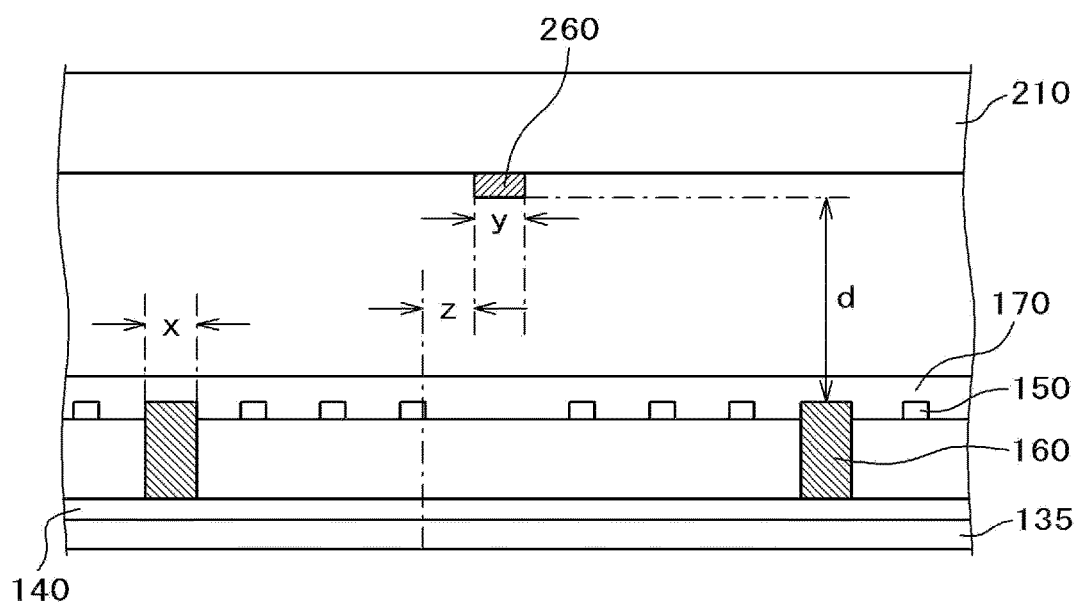
FIG. 4 is a cross sectional view of the principal part for explaining the conditions for the width of the asymmetry improving electrode of the liquid crystal display device according to the first embodiment of the present invention.

In the configuration in FIG. 4, the conditions were set to x=4 μm, y=4 μm, z=2 μm, and d=3 μm, the liquid crystal display device illustrated in FIG. 11 was manufactured, and then a high quality image with no display unevenness was obtained. Moreover, the conditions were set to x=3 μm, y=4 μm, z=2 μm, and d=3.4 μm, the liquid crystal display device illustrated in FIG. 11 was manufactured, and then a high quality image with no display unevenness was obtained. It is noted that it is without saying that the columnar spacer that defines the distance when the TFT substrate and the counter substrate are stacked is formed on the region on which the asymmetry improving electrode is not disposed. Furthermore, the alignment film on the counter substrate side was formed after forming the asymmetry improving electrode and the columnar spacer.

As described above, according to the embodiment, it is possible to provide a liquid crystal display device that a high quality image with suppressed display unevenness can be obtained even in the case where a common metal electrode is provided for decreasing the resistance of interconnections of a touch sensor.

Second Embodiment

Figure 5:
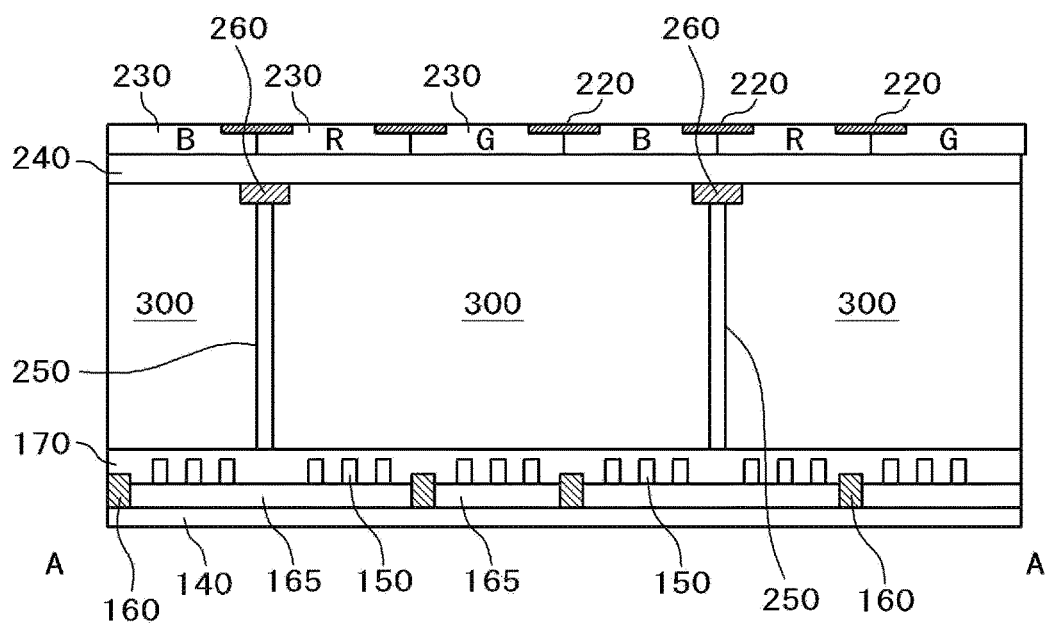
FIG. 5 is a cross sectional view of the principal part of a liquid crystal display device according to a second embodiment of the present invention.

A second embodiment of the present invention will be described with reference to FIG. 5. It is noted that matters that are described in the first embodiment and not described in the second embodiment are also applicable to the second embodiment unless otherwise specified. FIG. 5 is a cross sectional view of the principal part of a liquid crystal display device according the embodiment. As illustrated in FIG. 5, the embodiment is different from the first embodiment in that the columnar spacer 250 is formed on the asymmetry improving electrode 260 disposed on the counter substrate side. The columnar spacer 250 and the asymmetry improving electrode 260 are both formed on the counter substrate, so that the columnar spacer 250 and the asymmetry improving electrode 260 can be easily aligned with each other as compared with the case where one is formed on the TFT substrate and the other is formed on the counter substrate. Moreover, the columnar spacer 250 and the asymmetry improving electrode 260 are both formed on the counter substrate, so that the distance between the TFT substrate and the counter substrate can be easily adjusted because the surface of the TFT substrate corresponding to the region on which the columnar spacer 250 is disposed can be flattened. It is noted that the alignment film on the counter substrate can be formed after forming the asymmetry improving electrode and the columnar spacer.

In the configuration in FIG. 5, the conditions were set to x=4 µm, y=4 µm, z=2 µm, and d=3 µm, the liquid crystal display device illustrated in FIG. 11 was manufactured, and then a high quality image with no display unevenness was obtained. Moreover, the conditions were set to x=3 µm, y=4 µm, z=2 µm, and d=3.4 µm, the liquid crystal display device illustrated in FIG. 11 was manufactured, and then a high quality image with no display unevenness was obtained.

As described above, according to the embodiment, the effect similar to the first embodiment can be obtained. Moreover, the tolerance of disposing the columnar spacer is improved by forming the columnar spacer on the asymmetry improving electrode, so that applications can be expanded to liquid crystal display devices in various structures.

The embodiments of the present invention are described. However, these embodiments are presented as examples, and not intended to limit the scope of the present invention. For example, the common metal electrode is described as the electrode that is asymmetrically disposed. However, the present invention is also applicable to other electrodes that are asymmetrically disposed. These novel embodiments can be implemented in other various forms, and omitted, replaced, and modified in various ways within the scope not deviating from the teachings of the present invention. These embodiments and modifications are included in the scope and teachings of the present invention, and included in the inventions in claims and the scope of the equivalents.

It is understood that a person skilled in the art can conceive various modifications and alterations in the scope of the ideas of the present invention, and these modifications and alterations are also included in the scope of the present invention. For example, ones that a person skilled in the art appropriately adds and removes a component or changes designs, adds and omits a process, or changes the conditions are also included in the scope of the present invention as long as the teachings of the present invention are embodied. Moreover, it is understood that other operations and effects that are derived from the forms described in the embodiments, apparent from the description of the present specification, or appropriately conceived by a person skilled in the art are of course derived from the present invention.

What is claimed is:

1. A liquid crystal display device comprising:
a first substrate;
a second substrate; and
a liquid crystal sandwiched between the first substrate and the second substrate,
the first substrate having a display area where subpixels are formed,
each of the subpixels comprising:
a thin film transistor,
a planarization film covering the thin film transistor,
a common electrode on the planarization film,
an interlayer insulating film on the common electrode,
a pixel electrode, formed on the interlayer insulating film, connects with a drain of the thin film transistor, and
a first metal electrode, extending in a first direction, is directly formed on the common electrode at the boundary of a pair of the subpixels,
the first metal electrode is not formed on the common electrode at the boundary of another pair of the subpixels,
the second substrate having color filters and a black matrix, the black matrix is formed between the color filters,
each of the color filters corresponds to each of the subpixels,
the first metal electrode overlaps with the black matrix in a plan view,
a second metal electrode, extending in a first direction, is formed on the black matrix corresponding to the boundary of another pair of the subpixels in a plan view,
wherein the second metal electrode does not overlap with the first metal electrode in a plan view, and
wherein a width of the first metal electrode in a second direction, which is perpendicular to the first direction, is defined as x; a width of the second metal electrode in the second direction is defined as y; a distance between the pixel electrode and the second metal electrode in the second direction in a plan view is defined as z; a distance between the first electrode and the second metal electrode in a third direction, which is perpendicular to both of the first direction and the second direction, is defined as d;
wherein a following relation is satisfied:

if $x>d$, $d/2<y/2<y/2+z$ if $x<d$, $x/2<y/2<y/2+z$.

2. The liquid crystal display device according to claim 1, wherein the second metal electrode affects asymmetry in a distribution of an electric potential at the boundary of another pair of the subpixels.

3. The liquid crystal display device according to claim 1, wherein the first metal electrode and the second metal electrode are set to have a same potential.

4. The liquid crystal display device according to claim 1, wherein a columnar spacer that defines a distance between the first substrate and the second substrate is formed on the second metal electrode on the second substrate side.

5. The liquid crystal display device according to claim 1, wherein: the liquid crystal display device has a built-in touch sensor; and
the common electrode also serves as an interconnection of the touch sensor.

* * * * *